United States Patent [19]

Micklich

[11] Patent Number: 5,584,615

[45] Date of Patent: Dec. 17, 1996

[54] PNEUMATIC PARTICULATE TRANSPORT WITH GRAVITY ASSISTED FLOW

[75] Inventor: Frank T. Micklich, Joliet, Ill.

[73] Assignee: UOP, Des Plaines, Ill.

[21] Appl. No.: 433,779

[22] Filed: May 3, 1995

Related U.S. Application Data

[62] Division of Ser. No. 172,965, Dec. 27, 1993, abandoned.

[51] Int. Cl.$^6$ ..................................................... B65G 53/10
[52] U.S. Cl. ........................................... 406/109; 406/174
[58] Field of Search ..................................... 406/108, 109, 406/141, 142, 143, 174, 175; 208/173, 174, 175

[56] References Cited

U.S. PATENT DOCUMENTS

| | | | |
|---|---|---|---|
| 2,568,379 | 9/1951 | Berg | 406/174 X |
| 3,647,680 | 3/1972 | Greenwood et al. | 208/65 |
| 3,652,231 | 3/1972 | Greenwood et al. | 422/223 |
| 4,202,673 | 5/1980 | Knowlton | 48/86 R |
| 4,576,712 | 5/1986 | Greenwood | 208/138 |
| 4,872,969 | 10/1989 | Sechrist | 208/173 |

OTHER PUBLICATIONS

"L–valve characterized for solid flow" by T. M. Knowlton et al., Hydrocarbon Processing, pp. 149–156 (Mar. 1978).

Primary Examiner—Andrew C. Pike
Attorney, Agent, or Firm—Thomas K. McBride; John G. Tolomei

[57] ABSTRACT

A system for transporting particulate material uses a combination of nonmechanical valves and pneumatic and gravity transport to reduce breakage of particulate material. This system is particularly useful for the conveyance of catalyst particles where a lift conduit raises the particles from a low elevation to a relatively higher elevation. A particular advantage of the arrangement is the elimination of pneumatic conveyance through elbows to reduce pressure drop and eliminate churning of catalyst particles. The elbows are replaced with an impactless flow diverter that uses gravity assisted conveyance to eliminate or minimize the attrition resulting from pneumatic conveyance.

20 Claims, 3 Drawing Sheets

*Fig. 1A*
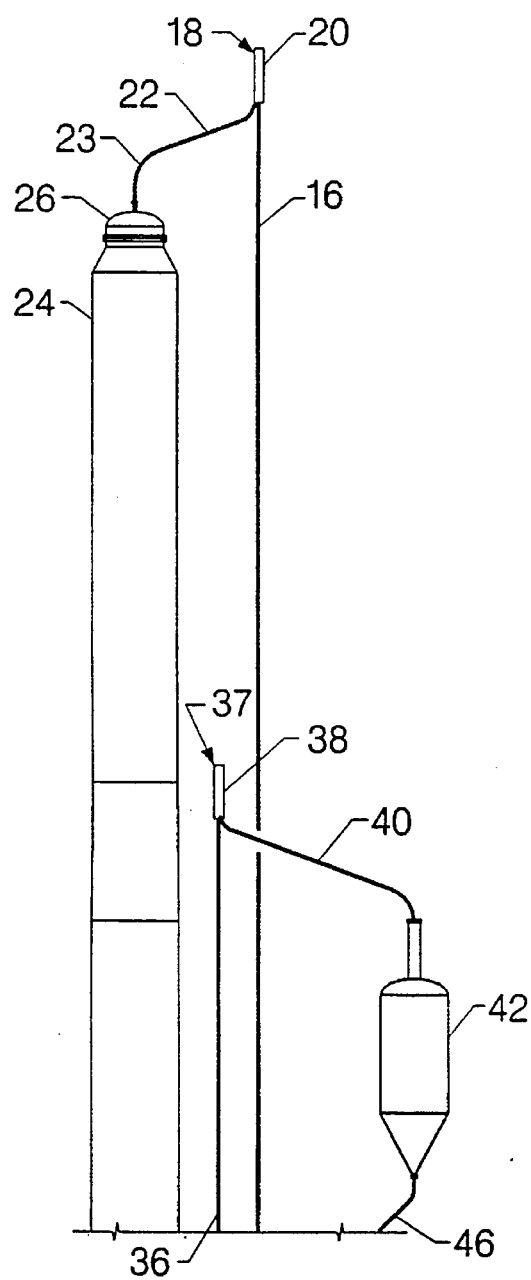
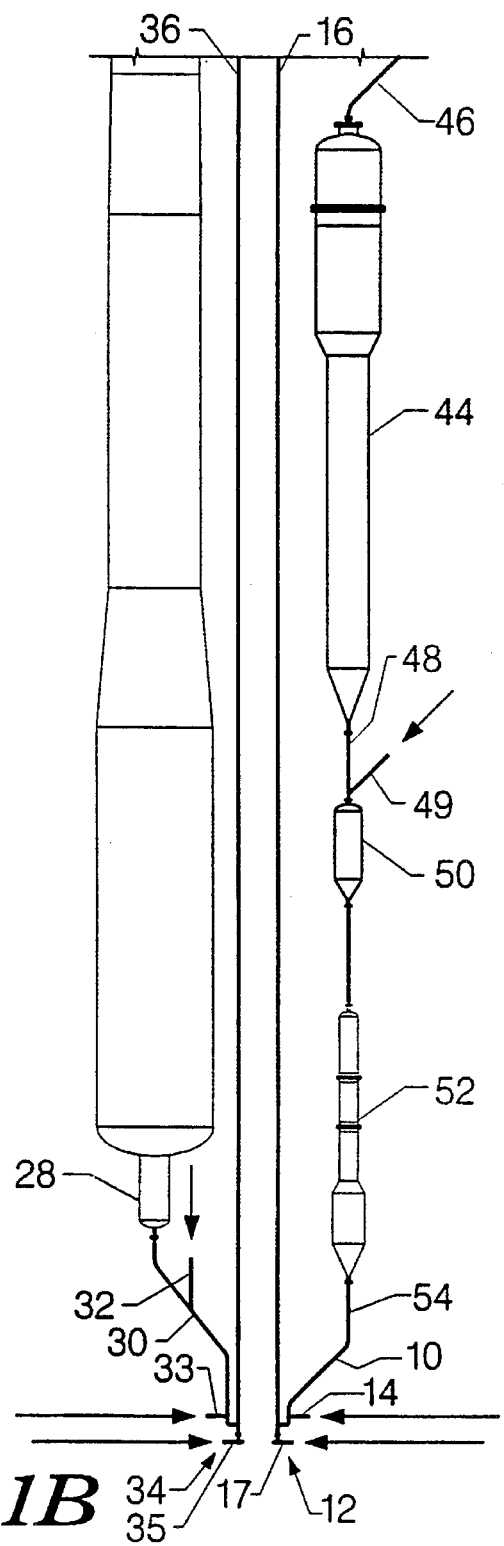
*Fig. 1B*

PNEUMATIC PARTICULATE TRANSPORT WITH GRAVITY ASSISTED FLOW

CROSS REFERENCE TO RELATED APPLICATIONS

This application is a division of U.S. application Ser. No. 172,965filed Dec. 27, 1993 now abandoned.

FIELD OF THE INVENTION

This invention relates to methods for transporting particulate material that is subject to erosion or breakage. More specifically, this invention relates to the vertical and horizontal transport of particulate material, at least partially by pneumatic means.

BACKGROUND OF THE INVENTION

A large number of processes are known that operate by contacting gases with discreet catalyst particles. Processes of this type can be generally separated into those that use microparticles and those that use macroparticles. Macroparticle processes generally use extruded or formed particles having effective diameters greater than a $\frac{1}{32}$ of an inch and are of a uniform or regular size. Processes that use macroparticles [hereinafter referred to as particulate material] routinely transfer the particulate material from one location to another. In many systems, such transport requires horizontal as well as vertical movement of the particulate material. Many of the macroparticles are relatively fragile and transport damages the particulate material by impingement or impact of the particles against each other or other surfaces. This attrition and breakage of regularly sized particulate material generates small fragments referred to as "fines" or fine particulate material.

Fines pose a multitude of operational problems for the processes that use regularly sized particulate material. For example, most processes that use particulate material of regular size contact the particles with a process fluid for the purpose of effecting a chemical reaction or imparting a physical change to the fluid or particulate material. In a number of these processes, it has been found necessary or desirable to transport the particulate material in and out of a contacting zone. In many such processes the contacting zone confines the particulate material in a retention bed or other space for holding the particulate material. The retention zone typically holds the particulate material at high density in a bed between two screens or other perforated device while a contacting fluid flows through the bed of particles. In such applications the minimum particle size must not exceed the size of the openings in the screen or other device to prevent particles from passing through openings with the fluid. Fines, when present, can pass through the opening of screens or other retaining elements and into the flow of process fluids from where they usually must be removed. In addition passage of the fines through the screen results in a loss of particulate material. Perhaps a bigger interference occurs when frees do not pass through, but plug portions of the screens or the bed thereby raising pressure drop. Where the particles are held in a dense bed, the sizing of the particles has an influence on the pressure drop. Particles of a uniform size will minimize pressure drop by permitting the maximum permeability of gas through the dense particle bed. Thus the presence of any frees raises overall pressure drop. Furthermore the presence of fines may also reduce the flowability of particulate materials and stop solids flow completely.

Many processes that use regularly sized particulate material are operated most efficiently by moving the particulate material while the process is in operation. Typical examples of such processes are catalytic processes for the conversion of hydrocarbons. In these processes, the catalysts are often composed of regularly sized particulate catalysts that become deactivated by the accumulation of coke deposits. The catalyst particles are regularly removed from the reaction zone to recondition the particles by removal of coke. Coke is normally removed from the catalyst by high temperature combustion, typically by contact with an oxygen-containing gas. Arrangements for continuously or semicontinuously removing such catalyst particles from a reaction zone to a regeneration zone for the removal of coke are well known.

Typical methods for transporting catalyst from one place to another in such an arrangement will use a system of conduits to move the particles from the bottom of the regeneration zone to the top of a reaction zone and from the bottom of a reaction zone to the top of a regeneration zone. This transport may occur in several stages wherein a number of retaining vessels hold catalyst particles as they are transported between reaction and regeneration portions of the process. The lifting of catalyst particles from one process region to another is usually done with some form of pneumatic conveying wherein a gas stream having sufficient velocity to lift the catalyst particles transports it upwardly for transport and disengagement into another series of vessels. Such systems of transport are well known and commonly use a number of pipe elbows and valve arrangements to direct and control the movement of the catalyst particles. As mentioned previously breakage of catalyst particles and the generation of fine particulate material has been a regularly observed and unwanted consequence of transporting catalyst particles in such systems.

The fines generated by such transport not only interfere with the operation of the beds but can also raise pressure drop for gases passing through the piping elements. High pressure drops associated with the transfer of particulate material adds to operational costs of the process and can interfere with maintenance of desirable operational conditions. As a result, methods have been sought to reduce the required pressure drop for conveyance of macroparticles in systems that contact gas and particulate material.

Long radius elbows have typically been used as standard piping elements in the conveyance of particulate matter. The long radius elbows have been employed to minimize attrition and pressure drop for the pneumatic conveyance of the particulate material.

It has been found that the pressure drop of long radius elbows is the result of disengagement of the catalyst particles from the gas flow in the long radius elbow. This disengagement of the gas flow causes slumping of the catalyst within the elbow and reacceleration of the catalyst as it continues transport through the elbow. This slumping and reacceleration apart from increasing pressure drop also creates a churning motion in the elbow that leads to high catalyst attrition.

SUMMARY OF THE INVENTION

Accordingly, it is highly desirable and methods are sought to reduce the generation of fine materials by alleviating particulate material attrition.

It is an object of this invention to reduce the pressure drop associated with the transfer of particulate material from one location to another in a process that contacts gas with particulate material.

It is an additional object of this invention to provide a transport system for lifting particulate material that will reduce breakage and attrition of the particulate material.

It is another object of this invention to reduce pressure drop as particulate material is pneumatically conveyed from one location to another in a process for contacting particulate material and gas streams.

This invention is a method and apparatus for lifting and conveying particulate material from one location to another that reduces or eliminates the damage caused by the conveying of particulate material through pipe elbows or conduits under pneumatic conditions. Pneumatic transport conditions are reduced or eliminated in a manner that reduces attrition or breakage of the particulate material. The method and apparatus regulate a transfer of catalyst particles into contact with a pneumatic conveying fluid in a lift conduit and changes the direction of particulate flow at the end of the lift conduit for transport into a retention vessel. The invention uses a combination of a nonmechanical valve for the introduction of particulate material into the lift conduit and an impactless diverter at the top of the lift conduit for transfer of the particulate material to a retention vessel. Accordingly the transport system of this invention uses the combination of a fluid regulated control valve and a low impact diverter to replace at least a portion of the pneumatic transport with gravity assisted transport.

The combination of the nonmechanical valve at the bottom of the lift conduit and the low impact diverter at the top of the lift conduit eliminates piping elements that were responsible for a large portion of particulate material breakage. The nonmechanical valve at the bottom of the lift conduit may comprise a number of well-known flow control pipe arrangements that are referred to as L valves, J valves, or K valves. The impactless diverter generally allows uniform flow of catalyst and lift gas away from an upwardly directed end of the conduit. The impactless diverter has a variety of forms which are further described herein.

Suitable flow control valves can take any form such as an L valve, a K valve, or a J valve. L valves are well known and described in an article titled "L Valves Characterized for Solid Flow", HYDROCARBON PROCESSING, March 1978, page 149. Such valves are generally referred to as nonmechanical valves and they use a small amount of aeration gas to control the flow of particulate solids therethrough. Detailed information on the design of nonmechanical valves, in particular L valves, can be found in the article. The nonmechanical valve regulates the flow of particulate material into a lift conduit. A lift gas transports the particulate material upwardly through the conduit. Nonmechanical handling of the particulate material through the nonmechanical valve limits attrition of particulate material before it enters the lift conduit.

The lift conduit has a substantially vertical orientation and lifts the particulate material by contact with a lift fluid. The lift gas enters the lift conduit below the addition point for the particulate material. In order to further reduce attrition through the lift conduit, means are provided to straighten the flow of the lift gas into the lift conduit. Such flow straightening means can include a screen to provide additional pressure drop and the elimination of elbows or other flow diverters that tend to create a nonuniform gas flow downstream.

An important function of this invention is the transporting of particulate material from an outlet end of the lift conduit to a horizontally offset location. In place of a traditional elbow, this invention uses a low impact diverter to change the vertical flow path of the catalyst particles traveling up the lift conduit to a principally horizontal direction in an angled conduit. Particulate material flows out of the riser outlet in a fountain like arrangement. The particulate material falls to a lower surface of the diverter that transfers the downward momentum of the falling catalyst by either redirecting the particles or absorbing the energy of the falling particles. The angled conduit provides a gravity assistance to the normal pneumatic conveying of the particulate material that serves to reduce attrition associated with the gas flow through and over the particulate material and the potential impingement of material at the end of the horizontal run. In a highly preferred form, the principally horizontal conduit has a compound angle that serves to initially accelerate the catalyst to a desired flow velocity and a second angle that maintains the flow at the constant velocity. In this preferred form, gravity provides the primary conveyance of particulate material. The first angle provides a rapid acceleration of the catalyst to reduce the amount of conduit cross section occupied by the particulate material. The rapid acceleration of the particulate material reduces or eliminates any region of increased gas velocity associated with the reduced cross-sectional area for gas flow caused by the low initial velocity of the catalyst.

Accordingly, in one embodiment this invention is an apparatus for the transport of particulate material. The apparatus comprises a lower conduit having an inlet at an upper end for receiving particulate material, a lift conduit extending in a substantially vertical direction, and a valve conduit. The valve conduit has a particle inlet in communication with a lower portion of the lower conduit, a particle outlet in communication with a lower portion of the lift conduit, and means for introducing a first fluid stream into the valve conduit between the particle inlet and the particle outlet. Additional means are provided for introducing a second fluid stream into the lift conduit to lift the particulate material. A discharge outlet defined by an upper portion of the lift conduit has a first cross-sectional area for fluid flow. The containment conduit surrounds the discharge outlet and defines a second cross-sectional area in a transverse direction at the discharge outlet that is greater than the first cross-sectional area. The containment conduit defines an outlet located below the discharge outlet and means for transferring momentum of the catalyst particles that fall from the containment conduit. An upper angled conduit defines an upper particle inlet at its upper end and an upper particle outlet at its lower end. The upper particle inlet is in direct communication with the discharge outlet.

In another embodiment, this invention is an apparatus for disengaging particles from a lift riser. The apparatus comprises a substantially vertical conduit having a first diameter and defining a vertically directed discharge outlet. The containment conduit surrounds the discharge outlet and extends above and below the discharge outlet. The containment conduit has a diameter at the discharge outlet that: is from 2 to 6 times larger than the diameter of the discharge outlet. A containment outlet located below the discharge outlet communicates with an upper angled conduit that defines an upper particle inlet at its upper end and an upper particle outlet at its lower end. The upper particle inlet is in direct communication with the discharge outlet and means in the containment conduit for transferring momentum of the particles that fall from the containment conduit.

In a process embodiment this invention is a hydrocarbon conversion process for contacting a hydrocarbon containing feedstream with a particulate catalyst at hydrocarbon conversion conditions in a reaction zone. Deactivated catalyst from the reaction zone passes from a bottom location to a top location in a regeneration zone. After reactivation the catalyst passes from a bottom location of the regeneration zone to a top location of the reaction zone. The process comprises transporting the catalyst from the top to the bottom locations by passing catalyst particles downward from a bottom location through a downwardly sloped lower conduit into a fluid controlled valve. Regulation of fluid flow into the fluid control valve delivers a controlled flow of catalyst to a lift conduit. The lift conduit conveys catalyst particles upwardly with a lift fluid and discharges catalyst particles upwardly from the lift conduit through a discharge outlet into a dilute volume. The dilute volume disengages the catalyst particles from the lift fluid. Catalyst particles drop in the dilute volume below the discharge outlet and the downward momentum of the catalyst particles is transferred below the discharge outlet. Catalyst particles from the dilute volume pass through an upper conduit that is sloped downwardly at an angle sufficient to maintain movement of the catalyst particles to the top location.

Further details, objects and embodiments of this invention are described in the following detailed description of the invention.

BRIEF DESCRIPTION OF THE DRAWINGS

FIG. 1A depicts an upper section of a sectional elevation of a reaction zone and a regeneration zone that uses the catalyst transport method and apparatus of this invention.

FIG. 1B depicts a lower section of the sectional elevation 1 which continues from the bottom of FIG. 1A.

FIG. 4 is an alternate form of a catalyst diverter.

DETAILED DESCRIPTION OF THE INVENTION

Figure 2:
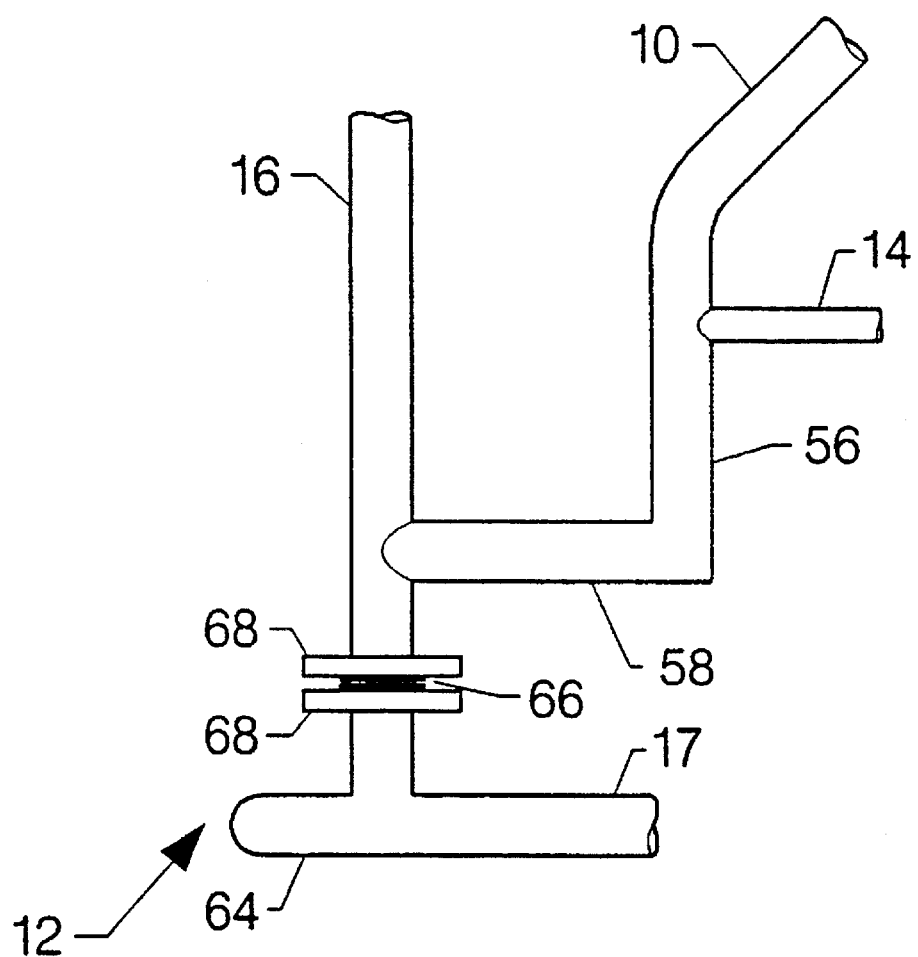
FIG. 2 is a nonmechanical control valve for regulating the transport of catalyst in the system of this invention.

The process and apparatus of this invention can be applied to any system wherein particulate material requires vertical transport in a manner that will reduce or eliminate breakage of the particulate material. Particulate material suitable for use in this invention will normally comprise geometric shapes of regular size. The maximum dimension of the particulate material will be substantially less than the conduits used for conveyance and transport of the particulate material. In most cases the particles will have a maximum dimension, typically measured as a diameter, of less than ½ inch and preferably less than ¼ inch. The most preferred type of particulate material in application is in hydrocarbon conversion processes.

The most widely practiced hydrocarbon conversion process to which the present invention is applicable is catalytic reforming. Therefore, the discussion herein of the present invention will be in reference to its application to a catalytic reforming reaction system. It is not intended that this discussion limit the scope of the present invention as set forth in the claims.

Catalytic reforming is a well-established hydrocarbon conversion process employed in the petroleum refining industry for improving the octane quality of hydrocarbon feedstocks, the primary product of reforming being motor gasoline. The art of catalytic reforming is well known and does not require detailed description herein.

Briefly, in catalytic reforming, a feedstock is admixed with a recycle stream comprising hydrogen and contacted with catalyst in a reaction zone. The usual feedstock for catalytic reforming is a petroleum fraction known as naphtha and having an initial boiling point of about 180° F. (80° C.) and an end boiling point of about 400° F. (205° C.). The catalytic reforming process is particularly applicable to the treatment of straight run gasolines comprised of relatively large concentrations of naphthenic and substantially straight chain paraffinic hydrocarbons, which are subject to aromatization through dehydrogenation and/or cyclization reactions.

Reforming may be defined as the total effect produced by dehydrogenation of cyclohexanes and dehydroisomerization of alkylcyclopentanes to yield aromatics, dehydrogenation of paraffins to yield olefins, dehydrocyclization of paraffins and olefins to yield aromatics, isomerization of n-paraffins, isomerization of alkylcycloparaffins to yield cyclohexanes, isomerization of substituted aromatics, and hydrocracking of paraffins. Further information of reforming processes may be found in, for example, U.S. Pat. Nos. 4,119,526 (Peters et al.); 4,409,095 (Peters); and 4,440,626 (Winter et al), the contents of which are herein incorporated by reference.

A catalytic reforming reaction is normally effected in the presence of catalyst particles comprised of one or more Group VIII noble metals (e.g., platinum, iridium, rhodium, palladium) and a halogen combined with a porous carrier, such as a refractory inorganic oxide. The halogen is normally chlorine. Alumina is a commonly used carrier. The particles are usually spheroidal and have a diameter of from about ¹⁄₁₆th to about ⅛th inch (1.5–3.1 mm), though they may be as large as ¼th inch (6.35 mm). In a particular reaction-regeneration system, however, it is desirable to use catalyst particles which fall in a relatively narrow size range. A preferred catalyst particle diameter is ¹⁄₁₆th inch (3.1 mm). During the course of a reforming reaction, catalyst particles become deactivated as a result of mechanisms such as the deposition of coke on the particles; that is, after a period of time in use, the ability of catalyst particles to promote reforming reactions decreases to the point that the catalyst is no longer useful. The catalyst must be reconditioned, or regenerated, before it can be reused in a reforming process.

In a preferred form, the reformer will employ a moving bed reaction zone and a regeneration zone. The present invention is applicable to a moving bed regeneration zone and a fixed bed regeneration zone. Fresh catalyst particles are fed to a reaction zone, which may be comprised of several subzones, and the particles flow through the zone by gravity. Catalyst is withdrawn from the bottom of the reaction zone and transported to a regeneration zone where a multistep regeneration process is used to remove the coke deposits and recondition the catalyst to restore its full reaction promoting ability. The art of moving bed regeneration zones is well known and does not require detailed description herein. Catalyst flows by gravity through the various regeneration steps and then is withdrawn from the regeneration zone and furnished to the reaction zone. Catalyst that is withdrawn from the regeneration zone is termed regenerated catalyst. Movement of catalyst through the zones is often referred to as continuous though, in practice, it may be semicontinuous. By semicontinuous movement is meant the repeated transfer of relatively small amounts of catalyst at closely spaced points in time. For example, one batch per minute may be withdrawn from the bottom of a reaction zone and withdrawal may take one-half minute, that is, catalyst will flow for one-half minute. If the inventory in the reaction zone is large, the catalyst bed may be considered to be continuously moving. A moving bed system has the advantage of maintaining production while the catalyst is removed or replaced.

FIGS. 1A, 1B illustrates a reactor and regenerator system for reforming reaction zone that uses the catalyst particle transport system of this invention to move catalyst. Starting then with the movement of regenerated catalyst, a lower conduit 10 supplies catalyst particles to a nonmechanical valve 12. Catalyst flows in dense phase transport through conduit 10. Dense phase transport refers to a flow where the catalyst particles essentially occupy the entire volume of the conduit. A regulating fluid enters valve 12 through a line 14 at a rate that regulates the transfer of catalyst particles through the nonmechanical valve into a lift conduit 16. As catalyst particles enter lift conduit 16, a lift fluid enters the bottom of the lift conduit through a line 17 and transports the catalyst particles upwardly through lift conduit 16. Catalyst particles are transported up the lift conduit in a transport mode where the flow of lift fluid is sufficient to lift the particles upwardly through the conduit. The lift fluid is usually added in sufficient amounts to create a superficial gas velocity through the lift conduit of at least 10 feet per second and more typically 25 to 30 feet per second. The lift conduit extends in a substantially vertical direction. By substantially vertical it is meant that the conduit will vary from the vertical by no more than 10° and preferably no more than 5°. At the top of conduit 16, catalyst particles and lift fluid enter a low impact diverter arrangement 18 that disengages the catalyst particles from the lift fluid without substantial impact damage to the catalyst particles.

Catalyst particles flow smoothly from the containment conduit 20 of the diverter arrangement into an upper angled conduit 22. Catalyst flow through conduit 22 is characterized by an only partial filling of the conduit such that the catalyst particles do not move through the conduit in dense phase flow. The particles preferably occupy less than 30% of the cross-sectional area of conduit 22 and more preferably less than 5% of the cross-sectional area of conduit 22. Catalyst flows smoothly in a hereinafter described manner through an elbow 23 at the bottom of upper conduit 22 and into the top of a stacked reactor arrangement 24.

Catalyst flows from the top to the bottom of the stacked reactor arrangement and passes through multiple stages of reaction in which process fluids contact the catalyst particles. Details of the contacting beds and other internals of the stacked reactor arrangement are well known to those skilled in the art and permit continuous or intermittent flow of the catalyst particles from the top 26 of the stacked reactor arrangement to a lower retention chamber 28 at the bottom of the stacked reactor arrangement.

Catalyst particles flow from the bottom of the stacked reactor arrangement through a lower conduit 30. It may be desirable to add catalyst particles to the reactor regenerator system in places where the catalyst flows in dense phase flow. Preferred locations for adding catalyst particles are in regions where there is dense phase catalyst movement. Thus, catalyst particles may be added through a conduit 32 into lower conduit 30. At the bottom of lower conduit 30 a nonmechanical valve arrangement 34 operates in a manner similar to that described for nonmechanical valve arrangement 12 to transfer catalyst particles upwardly through a lift conduit 36 by the addition of a regulating fluid to conduit 30 by a conduit 33 and the addition of a lift fluid into conduit 36 via a conduit 35.

Catalyst particles travel up through lift conduit 36, into a low impact diverter 37, and over from a containment conduit 38 to a disengaging hopper 42 via a conduit 40 in a similar manner to that previously described for conduit 16, diverter 18, and conduit 22. Catalyst flows downwardly from upper conduit 40 in essential dense phase flow through disengaging hopper 42 and a regeneration vessel 44 which receives catalyst from the disengaging hopper via a conduit 46. The disengaging hopper maintains a volume of catalyst to balance transitory differences in the flow that may occur during an intermittent transport of catalyst through the reactor stack and the regenerator vessel. After removal of coke and reconditioning of catalyst particles in the regeneration vessel 44, a conduit 48 transfers catalyst to a nitrogen seal drum 50 and a lock hopper arrangement 52. A conduit 49 may also provide a location for introducing additional catalyst into the catalyst transport system. The nitrogen seal drum and lock hopper arrangement 52 control the transfer of catalyst back to the reactor via the previously described lift arrangement. The nitrogen seal and lock hopper arrangement also displaces oxygen gas from the dense flowing stream of catalyst particles to prevent any carry over of oxygen into the reactor side of the process. Lock hopper and seal drum arrangements are well known to those skilled in the art and may be used in any of their current well-known forms to supply a dense phase flow of catalyst through a vertical conduit 54 and into lower conduit 10.

Lower conduit 10 transfers catalyst horizontally from the vertical center line of the regeneration vessel 44 to the nonmechanical valve 12. Preferably conduit 10 will have an angle from the horizontal that is greater than 30°. An angle greater than 30° avoids stratification of the flow wherein catalyst flows over a lower portion of the line while gas flows through an upper portion. Stratified flow is desirable in a conduit such as upper angled conduit 22, but undesirable in lower angled conduit 10 because it reduces pressure drop for gas flow through the line and prevents the maintenance of a gas seal.

Lower angled conduit 10 delivers dense phase catalyst to the nonmechanical valve 12. Nonmechanical valve can take on previously mentioned forms such as J valves, I valves, and K valves. Such valves are well known as is their use of aeration gas in conjunction with a geometrical shape to control the flow rate of particulate solids through it. The L, J, and K generally refer to the overall configuration formed by the geometric shape of the piping that transfers the particulate solids. Aeration gas enters the piping geometry formed by the valve at a location where it will create a drag force on the particles sufficient to initiate particle movement through the valve. Further information on the operation of such valves can be found in the above-mentioned Hydrocarbon Processing article as well as a text entitled GAS FLUIDIZATION TECHNOLOGY, edited by D. Geldart, John Wiley & Sons, 1986, and U.S. Pat. No. 4,202,673, the contents of which are hereby incorporated by reference.

FIG. 2 shows the preferred L valve arrangement for the nonmechanical valve 12. Looking then at FIG. 2, a dense loading of catalyst particles from conduit 10 fills a vertical leg 56 of the L valve arrangement. The dense particle loading also extends from conduit 56 into a horizontal leg 58. Aeration gas enters the vertical leg through conduit 14 at a location above horizontal conduit 58. The exact location of conduit 14 is determined based on overall flow requirements and specific valve geometry in a manner well known to those skilled in the art. The introduction of aeration gas through conduit 14 causes a flow of catalyst particles through conduits 56 and 58 and into lift conduit 16. Lift fluid enters conduit 16 through conduit 17. A "T" 64 at the bottom of lift conduit 16 aids in the uniform distribution of the lift fluid across conduit 16 by reducing or eliminating the stagnation of flow associated with a change in flow direction. An additional flow distribution element such as a screen 66 may be placed across the flow path of lift conduit 16 below horizontal conduit 58 to provide a slight pressure drop and further eliminate any maldistribution of flow. Screen 66 may be held in place by any known method such as flanges 68. A uniform distribution of flow below conduit 58 creates a more uniform lifting of the catalyst and further avoids attrition of catalyst particles by eliminating churning and turbulence as the particulate material enters lift conduit 16. In this manner the nonmechanical valve eliminates direct breakage by passage of particulate material through mechanical valve elements and, in addition, the smooth flow characteristics provided by the particular L valve arrangement of FIG. 2 further reduce the breakage and attrition of particulate material caused by the change in direction of the catalyst particles.

Figure 3:
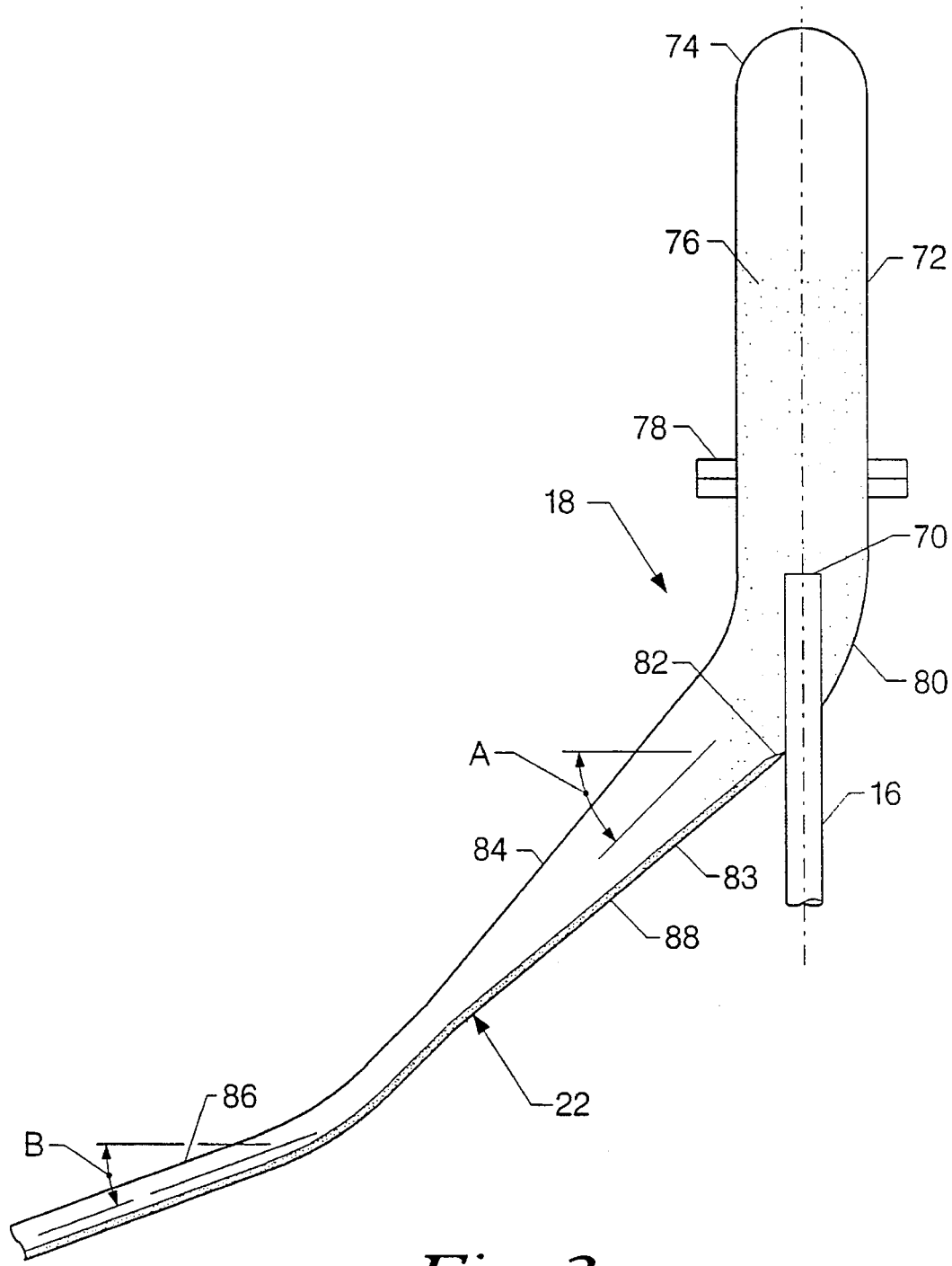
FIG. 3 is a sectional view of a low impact diverter located at the top of a lift conduit.

Flow diverter 18 located at the top of the riser also has an arrangement that further reduces the breakage and attrition of catalyst particles associated with the change in direction and momentum of the catalyst particles at the top of lift conduit 16. Looking then at FIG. 3, the top of the riser conduit 16 defines a discharge outlet 70 located in a containment conduit 72. Containment conduit 72 has an upper end 74 that is closed to fluid flow and defines a dilute phase zone 76. Catalyst enters the dilute phase 76 and is disengaged from the lift fluid as both catalyst and gas are discharged into dilute phase 76 from discharge outlet 70. As the lift fluid expands upon entering dilute phase 76, the catalyst particles lose lift and upward momentum and eventually fall to the bottom of the dilute phase 76. At the location of discharge outlet 70, the transverse cross-sectional area of dilute phase 76 is greater than the cross-sectional area of the discharge outlet. In most cases, containment conduit 72 will have a diameter that is equal to 2 to 6 times the diameter of the discharge outlet. Preferably the dilute phase zone will extend for at least 1 foot and more preferably between 24 and 60 inches above discharge outlet 70. Although FIG. 3 shows dilute phase 76 as a cylindrical volume above discharge outlet 70, the volume of dilute phase 76 above discharge outlet 70 may have any form. A frustoconical shape above discharge outlet 70 is particularly preferred for dilute volume 76. The arrangement of the frustoconical shape places the large portion of the frustum at the level of discharge outlet 70 so that catalyst particles are further cushioned as they shoot into the upper portion of dilute volume 76. While the frustoconical shape may be preferred from an overall operational standpoint the cylindrical conduit shape shown in FIG. 3 is generally preferred for cost and simplicity reasons. The preferred arrangement of the diverter 72 also used a pair of flanges 78 to permit removal of an upper portion of the containment conduit for inspection and maintenance.

Dilute phase 76 extends below outlet 70. As catalyst particles fall from the dilute phase, they contact a surface 80. Surface 80 provides a means for transferring the downward momentum of the catalyst particles. In preferred form, surface 80 is an elbow that provides a continuous curve from the wall of containment conduit 70 to an inlet 82 of upper angled conduit 22. With the smooth arrangement of surface 80, catalyst particles that fall into contact with the outside surface of the elbow have their downward momentum smoothly deflected with only a small change from their original angle of incidence. As the particles from the outer portion of the elbow flow downwardly, they begin to create a layer 83 of catalyst particles 83 on lower portions of the elbow. Momentum from catalyst particles that fall more to the inside of elbow 80 have their momentum transferred to and absorbed by the layer 83 of catalyst particles. The transfer of momentum to the layer of catalyst particles further cushions those particles against damage from direct contact with the wall of elbow 80 since these particles have a greater angle of incidence and a smooth deflection is not possible. Thus an elbow arrangement that provides surface 80 uses a combination of deflection and cushioning to prevent catalyst breakage.

In another form of this invention, the bottom of dilute phase 76 may consist simply of an angled plate. Such an angled plate would build-up a thin layer of catalyst over its entire surface. In such arrangement, the transfer of momentum of the catalyst particles is entirely to other catalyst particles. Contact between the catalyst particles in this thin layer would provide the entire cushioning effect to avoid breakage of catalyst particles.

Angled conduit 22 prevents any excessive build-up of catalyst particles at the bottom of dilute phase 76 so that the level of catalyst particles never approaches discharge outlet 70. The overall angle of conduit 22 is preferably selected to maintain a gravity transfer of catalyst particles from the bottom of the containment conduit 72 to the lower end of upper conduit 22. The gravity assistance is preferably arranged such that the catalyst particles do not stop along the lower surface of conduit 22, but continue to slide along the surface of conduit 22 over its entire length. However, the angle of conduit 22 is also preferably selected to avoid excessive velocity at the end of conduit 22 where the catalyst particles are discharged or, more typically, change direction in a long radius elbow. Excessive velocity into the long radius elbow will cause particulate material to shoot across the diameter of the conduit and contact the wall of the elbow opposite the side from which the particles enter. Such excessive velocity again creates collisions between the particles and excessive particle breakage. It has generally been found for these purposes that the conduit should have an angle of from 20° to 45° from the horizontal.

Maintaining gravity assisted velocity through conduit 22 reduces attrition due to the presence of gas and catalyst transport through the conduit. As the velocity of the particulate material flowing through angle conduit 22 drops off, the volume of the conduit occupied by catalyst particles increases. Filling more of the conduit cross section with catalyst particles raises the gas velocity along the upper portion of the conduit. With reduced catalyst velocity and increased gas velocity, the upper layer of catalyst particles begin a strand-type catalyst transfer. Such a catalyst transfer increases breakage and attrition of catalyst particles through the conduit. In the strand-type transfer, high velocity gas transports particles through repeated steps of lifting and dropping. The many collisions caused by this type of transfer are again a source of catalyst particle breakage.

In order to provide a further means of avoiding this type of transport, angled conduit 22 will preferably have dual angles. FIG. 3 shows a first angled portion in the form of a chute 84 that has a steeper angle relative to a second angled pipe portion 86. The upper angled section of chute 84 will typically be in a range of from 30° to 50° from the horizontal as indicated by angle "A". This upper angled portion is determined such that the slope of the bottom surface 88 will have an angle that allows the catalyst particles to overcome the sliding frictional resistance of the conduit and accelerate the catalyst to a desired velocity. Typically, the desired velocity in the upper conduit 22 is at least 8 ft/sec and more preferably 10 ft/sec. Once the angled portion of conduit "A"

accelerates the catalyst to a desired velocity, the angle of lower angled portion 86 is set to maintain, but not increase, that velocity. Typically the angle of lower pipe portion 86 will be in a range of from 10° to 30° as given by angle "B". This angle is set as the angle necessary for the catalyst particles to just overcome the sliding frictional resistance. Thus, in the preferred arrangement, the catalyst particles maintain a uniform velocity through the lowered angled section 86. For most catalyst, it has been found that a 20° angle will produce steady state movement through lower conduit 86.

Preferably upper angled portion of chute 84 will be in the form of a concentric reducer. The concentric reducer will typically have an included angle of from 5° to 20°. As the angle of the reducer changes its diameter, it provides a smooth flow path for both the accelerating catalyst particles and the gas flow. Acceleration of the gas flow to higher velocities with the reducing cross-sectional area of a concentric reducer does not promote attrition once the catalyst has accelerated to a higher velocity. The high velocity of the catalyst causes it to occupy very little of the volume of the reducer near its outlet end and also reduces any relative difference in velocity between the catalyst and the gas. As a result, there is no strand-type flow with lifting and dropping of catalyst particles that occurs anywhere in the apparatus.

Although it is preferred, the dual angled sections and the concentric reducer of the diverter arrangement shown in FIG. 3 increases its overall length. Accordingly, it is possible to use a diverter arrangement such as shown in FIG. 4. The low impact diverter arrangement of FIG. 4 is simple to construct and has a greatly reduced extension of horizontal piping. The arrangement of FIG. 4 depicts a lift conduit 16' that extends into a containment conduit 90. Containment conduit 90 surrounds an outlet end 92 of the lift conduit which discharges catalyst particles vertically into a dilute phase surrounded by closed conduit 90. Lift fluid and catalyst particles travel downwardly to the outside of lift pipe 16' and into a long radius elbow 94 that has the same diameter of containment conduit 90. The diameter of long radius elbow 94 goes through staged reductions provided by eccentric pipe reducers 96 and 98 to a desired conduit diameter maintained by a flanged portion 100. The pipe elbow and eccentric reducers provide a continuous curve for the catalyst that flows along the bottom of the elbow and reducers. Catalyst exits the lower portion of the diverter through flange 100 which may be flanged to another pipe section for transfer of the catalyst particles to a desired location. The catalyst diverter shown in FIG. 4 has the advantages of low cost and minimum horizontal length.

What is claimed is:

1. An apparatus for transport of particulate material, said apparatus comprising:

a) a lower conduit having an inlet at an upper end for receiving the particulate material;

b) a lift conduit extending in a substantially vertical direction;

c) a valve conduit having a valve inlet in communication with a lower portion of said lower conduit for receiving the particulate material, a valve outlet in communication with a lower portion of said lift conduit for discharging the particulate material, and means for introducing a first fluid stream into said valve conduit between said valve inlet and said valve outlet at a controlled rate;

d) means for introducing a second fluid stream into said lift conduit;

e) a discharge outlet defined by an upper portion of said lift conduit and having a first cross-sectional area for fluid flow;

f) a containment conduit surrounding said discharge outlet, said containment conduit defining a second cross-sectional area in a transverse direction at said discharge outlet that is greater than said first cross-sectional area, a containment outlet located below said discharge outlet, and means for transferring momentum of the particulate material that falls from said containment conduit; and g) an upper angled conduit defining an upper particle inlet at an upper end thereof and an upper particle outlet at a lower end thereof wherein said upper particle inlet is in communication with said discharge outlet and said upper angled conduit has a first angled portion in direct communication with said containment outlet and a second angled portion below said first angled portion, and said first angled portion is steeper than said second angled portion.

2. The apparatus of claim 1 wherein said upper angled conduit has an angle of from 20° to 45° from horizontal.

3. The apparatus of claim 1 wherein said upper particle outlet defines a smaller diameter than said upper particle inlet.

4. The apparatus of claim 1 wherein said first angled portion has a larger average diameter than said second angled portion.

5. The apparatus of claim 4 wherein said first angled portion defines a concentric reducer.

6. The apparatus of claim 5 wherein said concentric reducer has an included angle of form 5° to 20°.

7. The apparatus of claim 1 wherein said first angled portion has a principle axis at an angle of from 30° to 50° from horizontal and said second angled portion has an angle from 10° to 30°.

8. The apparatus of claim 1 wherein said containment conduit has a uniform diameter.

9. The apparatus of claim 1 wherein said discharge outlet has a diameter and said containment conduit has a diameter that is less than 6 times the diameter of said discharge outlet.

10. The apparatus of claim 1 wherein said containment conduit extends vertically from 24 to 60 inches above said discharge outlet.

11. The apparatus of claim 1 wherein said valve conduit is an L valve having a vertical leg that defines said valve inlet and a horizontal leg that defines said valve outlet, and said means for introducing said first fluid stream includes a gas inlet defined by said vertical leg.

12. The apparatus of claim 1 wherein said lift conduit is vertical.

13. The apparatus of claim 1 wherein said means for transferring momentum is a sloped surface.

14. The apparatus of claim 13 wherein said containment conduit is vertical and said sloped surface is a pipe elbow that provides a continuous curve between a wall of said containment conduit and the inlet of said upper angled conduit.

15. An apparatus for disengaging particles from a lift riser, said apparatus comprising:

a substantially vertical conduit having a first diameter and defining a vertically directed discharge outlet;

b) a containment conduit surrounding said discharge outlet and extending above and below said discharge outlet, said containment conduit having a second diameter at said discharge outlet that is from 2 to 6 times said first diameter, a containment outlet located below said discharge outlet, and means for transferring momentum of the particles that fall from said containment conduit; and c) an upper angled conduit defining an upper particle inlet at an upper end thereof and an upper particle outlet at a lower end thereof wherein said upper particle inlet is in communication with said discharge outlet and said upper angled conduit has a first angled portion in direct communication with said containment outlet and a second angled portion below said first angled portion, and said first angled portion is steeper than said second angled portion.

16. An apparatus for transport of particulate material, said apparatus comprising:

a) a lower conduit having an inlet at an upper end for receiving the particulate material;

b) a lift conduit extending in a substantially vertical direction;

c) a valve conduit having a valve inlet in communication with a lower portion of said lower conduit for receiving the particulate material, a valve outlet in communication with a lower portion of said lift conduit for discharging the particulate material, and means for introducing a first fluid stream into said valve conduit between said valve inlet and said valve outlet at a controlled rate;

d) means for introducing a second fluid stream into said lift conduit;

e) a discharge outlet defined by an upper portion of said lift conduit and having a first cross-sectional area for fluid flow;

f) a containment conduit surrounding said discharge outlet, said containment conduit defining a second cross-sectional area in a transverse direction at said discharge outlet that is greater than said first cross-sectional area, a containment outlet located below said discharge outlet, and means for transferring momentum of the particulate material that falls from said containment conduit; and g) an upper angled conduit defining an upper particle inlet at an upper end thereof and an upper particle outlet at a lower end thereof wherein said upper particle inlet is in communication with said discharge outlet and said upper particle outlet defines a smaller diameter than said upper particle inlet.

17. The apparatus of claim 16 wherein said containment conduit has a uniform diameter.

18. The apparatus of claim 16 wherein said valve conduit is an L valve having a vertical leg that defines said valve inlet and a horizontal leg that defines said valve outlet, and said means for introducing said first fluid stream includes a gas inlet defined by said vertical leg.

19. The apparatus of claim 16 wherein said means for transferring momentum is a sloped surface.

20. The apparatus of claim 19 wherein said containment conduit is vertical and said sloped surface is a pipe elbow that provides a continuous curve between a wall of said containment conduit and the inlet of said upper angled conduit.

* * * * *